G. D. COATES.
REPAIR HEEL.
APPLICATION FILED NOV. 11, 1910.

1,020,800.

Patented Mar. 19, 1912.

Inventor
George D. Coates
By Victor J. Evans
Attorney

Witnesses

UNITED STATES PATENT OFFICE.

GEORGE D. COATES, OF TORRINGTON, CONNECTICUT.

REPAIR-HEEL.

1,020,800. Specification of Letters Patent. Patented Mar. 19, 1912.

Application filed November 11, 1910. Serial No. 591,837.

*To all whom it may concern:*

Be it known that I, GEORGE D. COATES, a citizen of the United States, residing at Torrington, in the county of Litchfield and State of Connecticut, have invented new and useful Improvements in Repair-Heels, of which the following is a specification.

This invention relates to repair heels and more particularly to that type which are adapted to be used in connection with rubber shoes or the like.

The object of the invention is the provision of a simple, efficient and unitary structure which may be readily and conveniently attached to worn arctics, rubber overshoes or the like.

A further object of the invention is the provision of a device of this character having means for reinforcing the counter and means for building up the worn portion of the heel.

Figure 1:
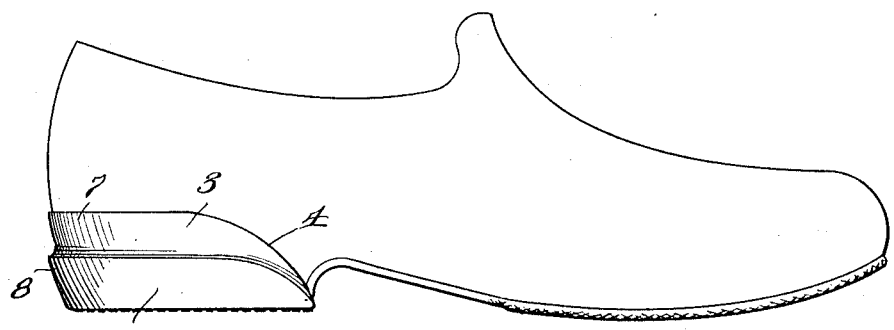
Figure 2:
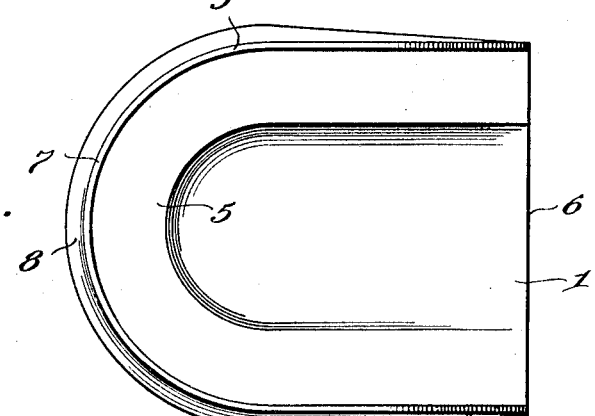
Figure 3:
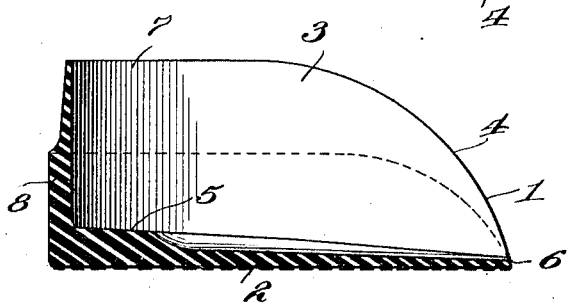

Further objects of the invention will appear as the following specific description is read in connection with the accompanying drawing which forms a part of this application, and in which:

Figure 1 is a side elevation showing the device applied to an overshoe. Fig. 2 is a top plan view of the device removed. Fig. 3 is a vertical longitudinal section.

Referring more particularly to the drawing the numeral 1 represents in general the attachment which is provided with a tread body 2 and a counter 3 which merges into the tread at its forward end by a gradual curve 4.

The entire attachment consists in an integral rubber structure whose tread is thickened or reinforced as at 5 adjacent the rear portion of the tread, which reinforced portion gradually merges into the tread proper from the back to the front and from the sides to the center. The forward edge of the tread portion has a relatively thin attaching edge 6 and the upper edge of the counter is also provided with a relatively thin attaching edge 7 which may be conveniently conformed to the shape of the shoe and cemented or otherwise secured thereto. The base of the counter at its juncture with the tread is reinforced as at 8 so as to strengthen the counter of the overshoe to which the device is applied. It will be noticed that the reinforcement 5 is on the inside, while the reinforcement 8 is on the outside, this latter arrangement permitting the cementing of the counter throughout its entire length to the shoe and the inner reinforcement taking the place of the worn away portion of the overshoe and permitting the entire inside of the tread to be cemented to said overshoe.

Having thus described the invention, what is claimed is—

A repair attachment for overshoes comprising a tread portion gradually tapering from one end to the other to form a thin attaching edge, a counter integral with the tread portion, a reinforcing band on the counter extending from the tread portion to a point midway of the height of the counter and merging into the latter, said counter having a thin attaching edge and said band tapering at its ends to merge into the counter, and a reinforcement joined to the counter and tread inside the form and tapering at its inner side edges and ends so as to merge into the tread and into the tread attaching edge.

In testimony whereof I affix my signature in presence of two witnesses.

GEORGE D. COATES.

Witnesses:
ARTHUR E. GUILDFORD,
BESSIE BURNS.

Copies of this patent may be obtained for five cents each, by addressing the "Commissioner of Patents, Washington, D. C."